INVENTOR.
FRANK HALEY
BY F.W. Anderson
C.E. Tripp
ATTORNEYS

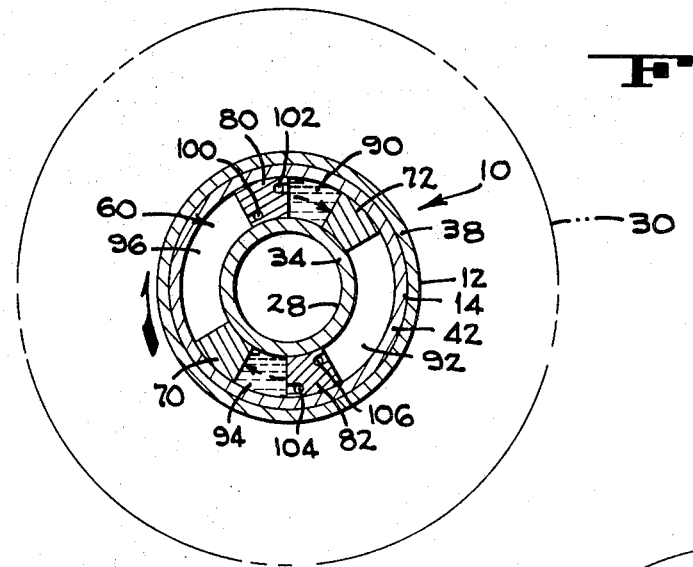
FIG_3
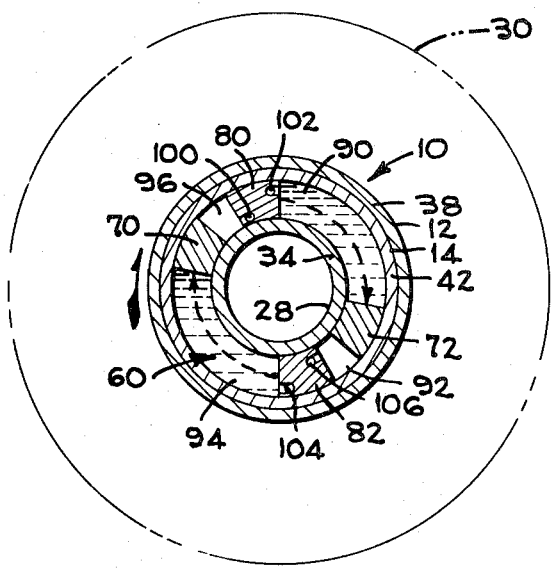
FIG_4
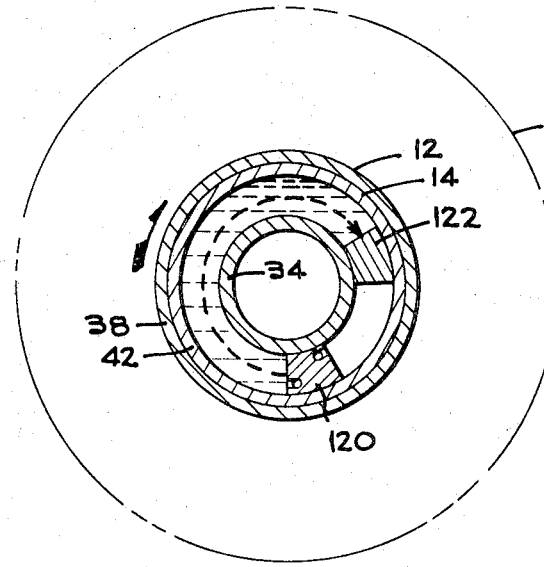
FIG_7
INVENTOR.
FRANK HALEY
BY F.W. Anderson
C.C. Tripp
ATTORNEYS March 2, 1971    F. HALEY    3,567,256
POWERED SWIVEL PIPE JOINT
Filed Dec. 13, 1968    3 Sheets-Sheet 3
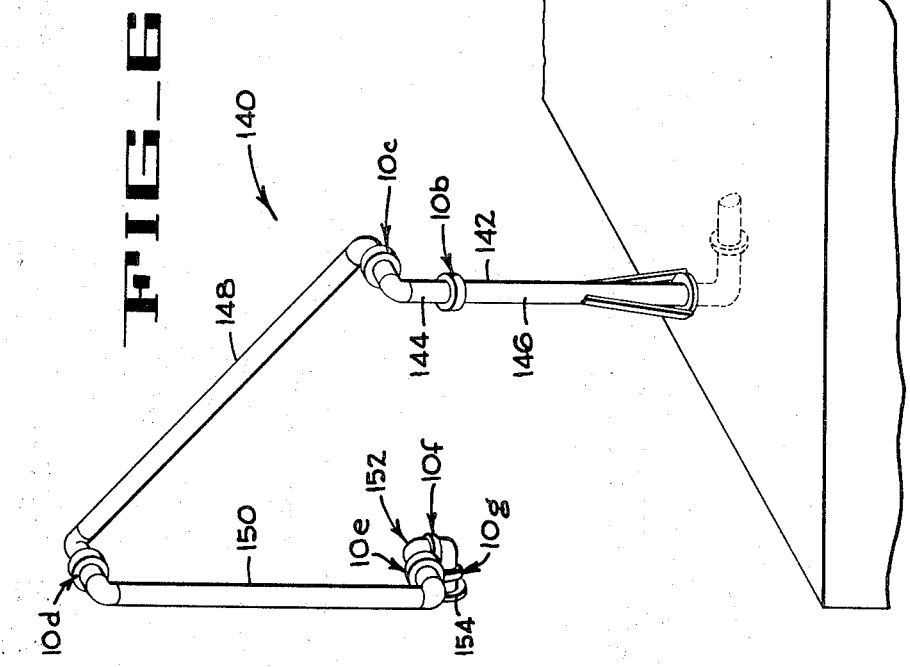
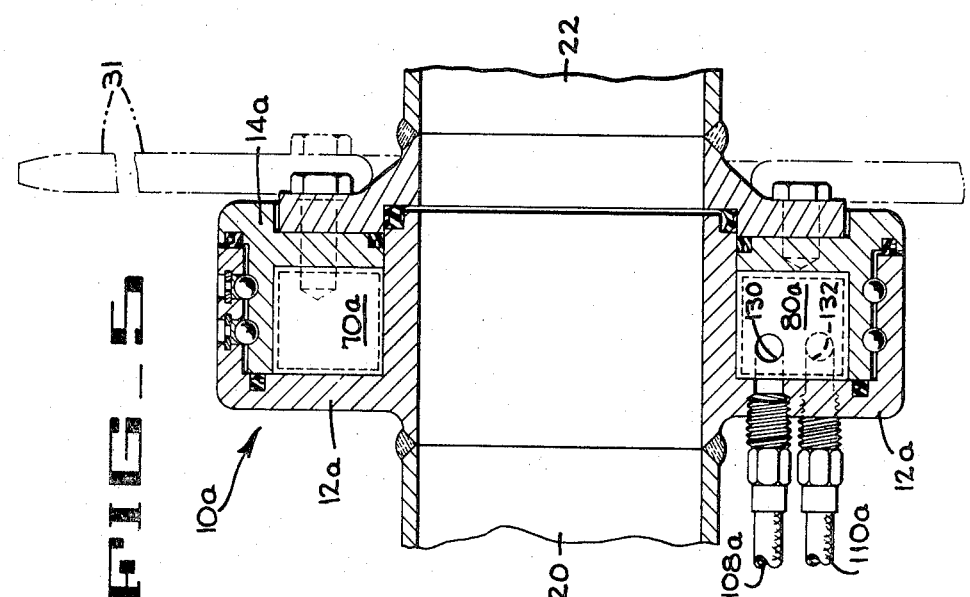
INVENTOR.
FRANK HALEY
BY *F. W. Anderson*
*C. C. Tripp*
ATTORNEYS United States Patent Office 3,567,256
Patented Mar. 2, 1971

3,567,256
POWERED SWIVEL PIPE JOINT
Frank Haley, Upland, Calif., assignor to FMC Corporation, San Jose, Calif.
Filed Dec. 13, 1968, Ser. No. 783,639
Int. Cl. F16l 55/00
U.S. Cl. 285—119
8 Claims

ABSTRACT OF THE DISCLOSURE

A swivel pipe joint having a fluid-powered motor for rotating one of the joints, two relatively rotatable members with respect to the other, and hence one of the pipe sections, to which the joint might be connected, with respect to the other section. The joint is designed so that either of these members can be rotated while the other is stationary, and provision is made for connecting a sheave, sprocket, gear, or the like to either member for transmitting the rotary motion to another element in addition to the connected pipe section.

BACKGROUND OF THE INVENTION

The present invention relates to swivel joints for providing a fluid-tight rotatable coupling between two pipe sections such that they can be rotated relative to each other about the common axis of their coupled ends, and to fluid motors for imparting rotary motion between two interconnected elements.

When it becomes desirable to couple two pipe sections together in a fluid-tight manner and yet enable one to rotate with respect to the other about their common axis, common practice is to employ a swivel pipe joint that, in general, comprises two annular members interfitted one within the other and secured together by an intermediate ball or other rollable bearing system. One pipe section is connected to one of the swivel joint members, and the other section connected to the other member, thus facilitating relative rotation between the sections, and suitable annular seals between the members maintain a fluid-tight relation between them.

This type of joint is used for coupling together pipes and other fluid conduits in a wide variety of environments, such as in marine loading arms, tank car and truck loading arms, fire monitors, and other fluid transferring or handling apparata. Often these devices are too large to maneuver by hand, thus requiring installation of a power system, and hydraulic cylinders either alone or in combination with chains and sprockets or cables and sheaves for transmitting the power from the cylinder to a relatively distant point, are frequently relied on. Although these hydraulic systems are satisfactory in many situations, in some instances the spatial requirements of these systems are too great, and their weight is excessive, for the intended installation. Also, cost frequently constitutes a third problem, ruling out everything but the barest essentials.

SUMMARY OF THE INVENTION

The present invention solves the foregoing problems by by providing a swivel pipe joint with a fluid-powered rotary-type motor between the joint's two relatively rotatable body members so that, by operating the motor, the body members and thus the pipe sections that may be connected thereto are rotated relative to each other. The motor comprises an annular fluid-tight chamber disposed between, and formed by, the joint's relatively rotatable body members, and this annular chamber is divided into a plurality of compartments by van-like axially-oriented partitions extending from each of the joint members into fluid-tight engagement with its opposite member. Fluid inlet and exhaust ports are provided for each compartment so that, by introducing fluid into selected compartments and exhausting fluid from the other compartments, the partitions are forced toward or away from each other, thereby imparting relative rotation between the joint members and, likewise, between the pipe sections to which these members are connected.

One of the swivel joint's relatively rotatable body members has the general configuration of an annular, open-ended housing that provides one end and the inner side wall of the annular motor chamber and the outer race of the swivel bearing system, while the other body member constitutes the annular, somewhat L-shaped in cross-section, cover that provides the other end wall and the outer side wall of the motor chamber, and in addition the inner race of the bearing system. Fluid can be introduced and exhausted into the motor's annular chamber through either of the housing or cover members, thereby enabling both members to function either as the stationary or the rotating member. Provision also is made for connecting a sheave, sprocket, gear, or the like coaxially to either the housing or the cover, if it is desirable to extend the movement of the rotating member to another location for another purpose.

A principal object of the present invention is to provide a new and improved swivel pipe joint.

Another object of the present invention is to provide a new type of fluid-powered motor for rotating a swivel pipe joint.

Another object of the present invention is to provide a new method of applying rotary hydraulic power to a swivel pipe joint.

Yet another object of the present invention is to provide an hydraulic-powered swivel pipe joint wherein either section of the joint can be held stationary and the other section rotated relative thereto.

Still another object of the present invention is to provide an hydraulic-powered swivel pipe joint that can be employed for rotating a pipe or other tubular member in a variety of problem situations, such as where space is at a premium and weight must be maintained minimal.

A further object of the present invention is to provide an hydraulic-powered swivel pipe joint for interconnecting the pipe sections of marine loading arms and other articulated conduit systems.

Another object of the present invention is to provide a new and improved system for maneuvering marine loading arms and various related apparatus.

A still further object of the present invention is to provide a new and improved apparatus for imparting rotary motion to sheaves, sprockets, gears, or the like, especially when part of fluid transferring apparatus.

BRIEF DESCRIPTION OF THE DRAWINGS

FIGS. 3 and 4 are diagrammatic views showing two operating positions of the joint of FIG. 1;

FIG. 5 is a view in longitudinal section of a modification of the swivel joint of FIGS. 1 and 2, wherein the cover member is rotatable and has a sprocket connected thereto as shown in phantom;

FIG. 6 is a view in perspective diagrammatically illustrating a marine loading arm with the swivel joint of this invention at various locations in the arm; and FIG. 7 is a diagrammatic view showing another version of the swivel joint of FIGS. 1-4.

DESCRIPTION OF THE PREFERRED EMBODIMENTS

Figure 2:
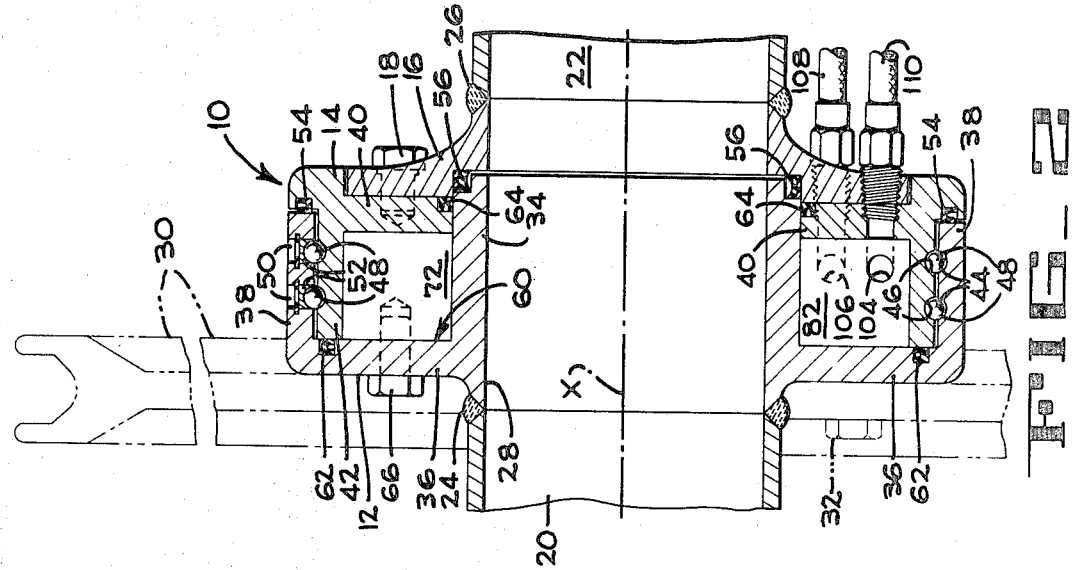
FIG. 2 is a view in longitudinal section, taken along line 2—2 of FIG. 1.
Figure 1:
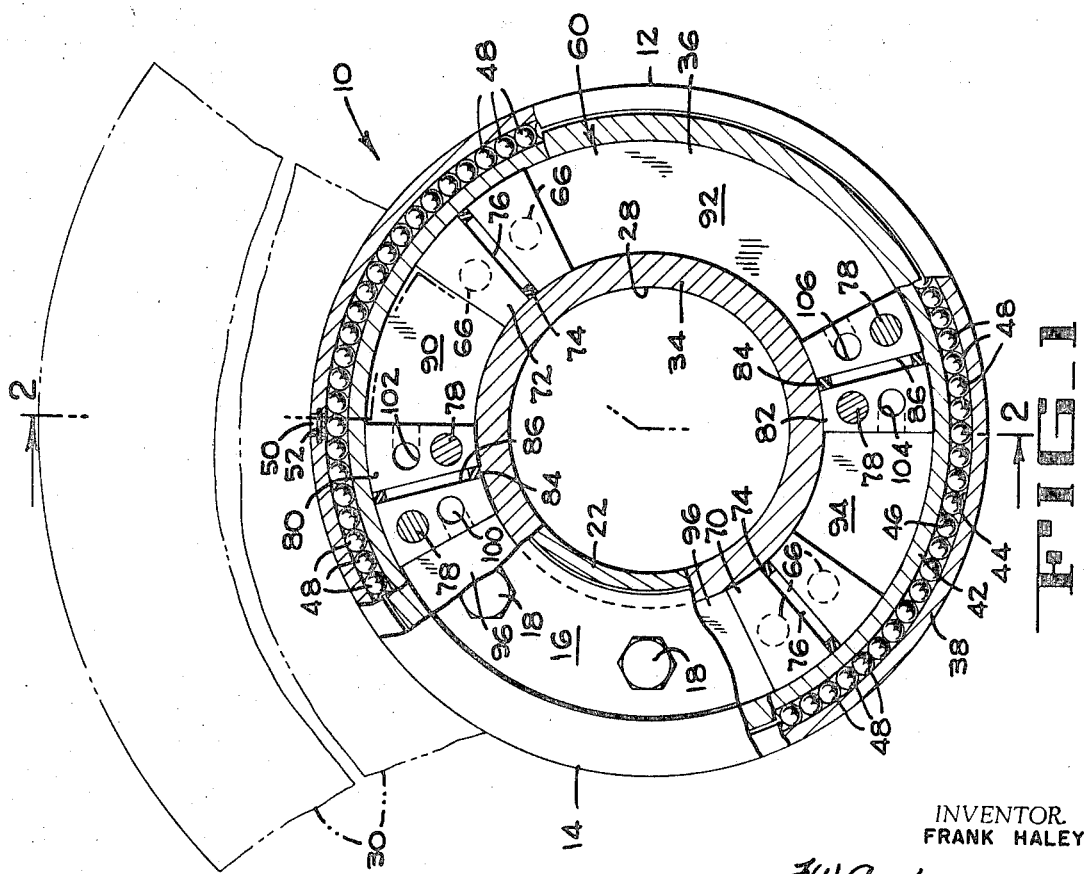
FIG. 1 is an end view, partially broken away, of a swivel joint constructed in accordance with the inention, showing the annular motor chamber, the partitions that divide it into compartments, and in phantom a portion of a sheave connected to the rotatable housing member.

Broadly considered, and as illustrated in FIGS. 1 and 2, the swivel joint 10 comprises a rotatable annular housing member 12, an annular cover member 14, and an annular flange member 16 removably fastened to the cover member 14 as by cap screws 18. As best seen in FIG. 2, in the installed condition the housing 12 and the flange 16 are connected to a pair of pipe sections 20, 22, respectively, as by welds 24, 26, so that the bore 28 of the swivel joint 10 is coaxial with the pipe sections. The housing 12 and the pipe section 20 rotate as a unit with respect to the unit constituted by the cover 14, the flange 16, and the pipe section 22 and, if a sheave, sprocket, gear, or other like element 30 (designated in phantom lines) is connected to the housing 12, such as by cap screws 32, this element 30 will likewise rotate with the housing 12 and its pipe section 20.

The peripheral area of the annular housing 12 is generally U-shaped in radial cross-section as shown in FIG. 2 and comprises an annular inner side wall 34, an integral annular end wall 36 extending radially outward from the inner side wall 34, and an integral annular outer side wall 38 extending axially from the outer peripheral portion of the end wall 36. The peripheral area of the cover 14 is generally L-shaped in radial cross section FIG. 2), having a radially-oriented annular end wall 40 and an integral side wall 42 extending axially from the end wall 40. In the assembled swivel joint 10, the side wall 42 of the cover 14 is telescoped into the outer side wall 38 of the housing 12, and the cover's end wall 40 closely circumscribes the housing's inner wall 34.

The housing 12 and the cover 14 are interconnected for free relative swiveling or rotary movement by a bearing system comprising outer races 44 in the inner surface of the housing's outer side wall 38, inner races 46 in the outer surface of the cover's side wall 42, and balls or other rollable members 48 that are insertable and removable through ports 50 in the side wall 38. As is conventional, the ports 50 are sealed by removable plugs 52. A suitable dynamic dust seal 54 (FIG. 2) is positioned between the housing's outer wall 38 and the cover 14, and another suitable dynamic seal 56 is positioned between the housing's inner wall 34 and the flange 16 to keep fluid from escaping out of the flow passage 28.

With the balls 48 in place in their races 44 and 46, the end walls 36 and 40 are in substantially fixed spaced rotation to each other, as also are the side walls 38, 42. Thus, the walls 34 and 36 of the housing 12 and the walls 40 and 42 of the cover 14 form an annular chamber 60 that, as seen in FIG. 2, is generally rectangular in cross section. This chamber is held fluid-tight by a first annular dynamic seal 62 positioned between the wall 36 and the end face of the wall 42, and a second annular dynamic seal 64 positioned between the wall 34 and the end face of the wall 40. Accordingly, so long as the seals 62, 64 are intact, the fluid-tight integrity of the chamber 60 is maintained, regardless of whether there is relative movement between the housing 12 and the cover 14.

Rigidly secured to the wall 36 of the housing 12, such as by means of cap screws 66, are two diametrically opposed block-like partitions 70 and 72 (FIGS. 1 and 3) that are provided with fluid sealing rings 74 fitted into circumferential grooves 76 located in planes that extend radially of the annular chamber 60 and bisect the partitions. Two similar diametrically opposed partitions 80 and 82 are rigidly secured to the wall 40 of the cover 14, such as by means of cap screws 78, and these partitions likewise have fluid seals 84 fitted within radially oriented, bisecting grooves 86 to provide a fluid-tight barrier between these partitions and the walls 34, 36, 42 and 40. The partitions 70 and 72, accordingly, rotate with the housing 12, and the partitions 80, 82 remain stationary with the cover 14.

The partitions 70, 72, 80 and 82 divide the annular chamber 60 into four-fluid-tight compartments 90, 92, 94, 96. Partition 80 is provided with two passages 100, 102 that open into the compartments 96, 90, respectively, and in a similar manner partition 82 is provided with two passages 104, 106 that open into the compartments 94, 92, respectively. A pair of hydraulic conduits 108 pass through the flange 16 and the wall 40 of the cover 14 into fluid communication with the passages 100 and 106, respectively, with only the conduit associated with passage 106 shown in FIG. 2, and another pair of hydraulic conduits 110 likewise pass through the flange and the cover to communicate with the passages 102 and 104, respectively, with only the conduit associated with passage 104 shown in FIG. 2.

Let it be assumed, for the purpose of simplicity in explaining the operation of the described structure, that pipe section 22 is stationary as, for instance, is a base pipe rising from a storage tank, and that it is necessary for pipe section 20 to be rotated relative to pipe section 22 about their common axis X to bring the opposite end of the pipe section 20 (or additional pipe sections connected thereto) into alignment with a fluid-receiving conduit. In order to rotate the pipe section 20 in a clockwise direction as viewed in FIG. 1, hydraulic fluid is pumped through the conduits 110 and the passages 102 and 104 of the partitions 80 and 82 into the compartments 90, 94, respectively. Since the partitions 80 and 82 are fixed to the cover 14 and therefore held stationary, the fluid moves the partitions 70 and 72, and thus the housing 12 and the pipe section 20, clockwise. As seen best in FIGS. 3 and 4, this expands the compartments 90 and 94, and at the same time contracts the compartments 92 and 96, therefore exhausting fluid in these latter compartments through the passages 106 and 100, respectively, into hydraulic lines 108. The pipe section 20 is rotated in the opposite direction, i.e., counterclockwise, merely by reversing the direction of flow of the hydraulic fluid so that it enters the compartments 92 and 96 through the passages 106 and 100, respectively, from the lines 108, and exits from the compartments 90 and 94 through the passages 102, 104 respectively, into the lines 110.

As illustrated in FIG. 5, the swivel joint 10 can be modified so that cover 14a and the pipe section 22 can be rotated, and the housing 12a and its attached pipe section 20 held stationary. In this embodiment, partition 70a and a counterpart (not shown) to partition 72 are attached to the cover 14a, and partition 80a and a counterpart (not shown) to partition 82 are attached to the housing 12a. Hydraulic lines 108a, 110a extend through the housing 12a to connect with passages 130 and 132, respectively, in the partition 80a, and also to connect with a similar set of passages (not shown) in the counterpart of partition 82. As a result, when operating pressure is applied to the fluid, the partition 70a and the counterpart to 72 are forced to move instead of the partition 80a and the counterpart to 82, thereby rotating the cover 14a and the pipe section 22, and also any sprocket 31, or sheave, gear, etc., that may be attached thereto.

Although I have shown two partitions on each of the housing 12 and cover 14, thereby dividing the annular chamber 60 into four separate compartments depending upon their rotary position relative to each other, it should be understood by those skilled in the art that a single fixed partition 120 (FIG. 7) and a single movable partion 122 on the housing and the cover may be sufficient if the weight of the pipe section to be rotated is relatively light, and that more than two partitions may be provided on the housing and the cover if an exceptionally heavy weight must be rotated.

With reference to FIG. 6, the swivel joint can be included in a marine or other type fluid loading arm 140 at any of several locations, depending only upon the prevailing need. For example, such a joint 10b can be installed in the riser pipe 142 so that the riser's upper section 144 can be rotated with respect to its lower section 146. A joint 10c can be used to rotatably connect the upper riser section 144 to the arm's inboard pipe section 148, and the rotatable connection between this inboard section and the outboard pipe section 150 also can be provided by a swivel joint 10d of the type disclosed herein. A very advantageous location for using these swivel joints is in the terminal coupling assembly 152 at the outer end of the arm section 150, whereby rotation of the joints 10e, 10f, and 10g facilitates easy alignment of the coupling's flange 154 with another pipe prior to their connection. Thus, a loading arm like 140 can be maneuvered in all directions with just the three swivel joints 10b, 10c and 10d, and its coupling assembly 152 properly positioned with the joints 10e, 10f, and 10g, in the absence of additional sheaves, cables, sprockets, chains, or other similar conventional apparata.

It also should be understood that this invention can be used in conjunction with the sheave-and-cable or sprocket-and-chain operated fluid transferring apparata, such as the various well-known marine loading arms, in lieu of the conventional swivel joints commonly employed to interconnect the pipe or other conduits. Thus, a swivel pipe joint according to this invention could provide not only a swivelable connection between the pipe sections but also a means for powering one of a pair of sheaves or sprockets to move its associated cable or chain, and through it the other sheave or sprocket and the pipe to which it is attached. In situations where the rotary power supplied by these new swivel pipe joints is sufficient to maneuver the arms through these conventional sheave-and-cable, etc., systems, the need for auxiliary motive power, such as hydraulic cylinders, can be eliminated.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A hydraulically operated swivel connection between adjacently-positioned coaxial pipe ends, comprising
   (a) an annular open-ended housing fixed to one of said pipe ends for rotation therewith, said housing including an annular outer side wall extending axially from an annular end wall,
   (b) a cover for said housing fixed to the other one of said pipe ends for rotation therewith, said cover including an annular side wall extending axially from an annular end wall, said cover telescoped with said housing with said cover side wall positioned adjacent to the outer side wall of said housing and said cover end wall closing the open end of said housing to form an annular fluid-tight chamber therewith,
   (c) partitions secured to said housing and said cover for dividing said housing into at least two fluid-tight compartments,
   (d) first passage means for introducing hydraulic fluid into and thereby expanding one of said compartments,
   (e) second passage means for exhausting hydraulic fluid from and thereby contracting another of said compartments and
   (f) means for holding the cover and the housing together while facilitating relative rotation therebetween.

2. A swivel connection according to claim 1 wherein said first passage means extends through the partitions secured to said housing, and said second passage means extends through the partitions secured to said cover.

3. A swivel connection according to claim 1 wherein said means for holding said cover and housing together comprises a rollable bearing system arranged between the inner surface of the outer side wall of said housing and the outer surface of the side wall of said cover.

4. A swivel connection according to claim 1 wherein said means for holding said cover and housing together comprises anti-friction ball races formed in the telescoped portions of said cover and housing with balls therein for holding said pipe ends together, said swivel connection also including fluid sealing means between relative rotating parts of said pipe ends for sealing off said housing.

5. A hydraulically operated swivel joint for interconnecting adjacently-positioned coaxial pipe ends, comprising
   (a) an annular open-ended housing adapted for securing to one of said pipe ends, said housing including an annular outer side wall extending axially from an annular end wall,
   (b) a cover for said housing and adapted for securing to the other one of said pipe ends, said cover including an annular side wall extending axially from an annular end wall, said cover telescoped with said housing with said cover side wall positioned adjacent to the outer side wall of said housing and said cover end wall closing the open end of said housing to form an annular fluid-tight chamber therewith,
   (c) partitions secured to said housing and said cover for dividing said housing into at least two fluid-tight compartments,
   (d) first passage means for introducing hydraulic fluid into and thereby expanding one of said compartments,
   (e) second passage means for exhausting hydraulic fluid from and thereby contracting another of said compartments, and
   (f) means for holding the cover and the housing together while facilitating relative rotation therebetween.

6. A swivel connection according to claim 5 wherein said first passage means extends through the partitions secured to said housing, and said second passage means extends through the partitions secured to said cover.

7. A swivel connection according to claim 5 wherein said means for holding said cover and housing together comprises a rollable bearing system arranged between the inner surface of the outer side wall of said housing and the outer surface of the side wall of said cover.

8. A swivel connection according to claim 5 wherein said means for holding said cover and housing together comprises anti-friction ball races formed in the telescoped portions of said cover and housing with balls therein for holding said cover and housing together, said swivel connection also including fluid sealing means between said cover and said housing for sealing off said pipe end when said swivel joint is installed therebetween.

References Cited

UNITED STATES PATENTS

| | | | |
|---|---|---|---|
| 616,200 | 12/1898 | Newcomb | 285—118X |
| 1,077,568 | 11/1913 | Sullivan et al | 92—122X |
| 2,708,907 | 5/1955 | Shafer | 92—122 |
| 2,726,881 | 12/1955 | Howard | 285—118 |
| 3,276,332 | 10/1966 | Jaffe | 92—122 |

DAVE W. AROLA, Primary Examiner

U.S. Cl. X.R.

91—121, 122; 285—276